(12) United States Patent
Zhou

(10) Patent No.: US 10,176,133 B2
(45) Date of Patent: Jan. 8, 2019

(54) SMART DEVICE WITH NO AP

(71) Applicant: Song Zhou, Shanghai (CN)

(72) Inventor: Song Zhou, Shanghai (CN)

(*) Notice: Subject to any disclaimer, the term of this patent is extended or adjusted under 35 U.S.C. 154(b) by 107 days.

(21) Appl. No.: 14/025,786

(22) Filed: Sep. 12, 2013

(65) Prior Publication Data
US 2014/0075063 A1 Mar. 13, 2014

(30) Foreign Application Priority Data

Sep. 12, 2012 (CN) .......................... 2012 1 0336681

(51) Int. Cl.
G06F 3/00 (2006.01)
G06F 13/12 (2006.01)
G06F 13/38 (2006.01)
G06F 21/34 (2013.01)
G06F 21/35 (2013.01)
G06F 3/08 (2006.01)

(52) U.S. Cl.
CPC .............. G06F 13/385 (2013.01); G06F 3/08 (2013.01); G06F 21/34 (2013.01); G06F 21/35 (2013.01)

(58) Field of Classification Search
CPC .............. G06F 3/08; G06F 21/34; G06F 21/35
USPC ......................... 710/63, 11, 15, 30
See application file for complete search history.

(56) References Cited

U.S. PATENT DOCUMENTS 7,359,997 B2   4/2008  Ishida et al.
8,403,688 B2   3/2013  Li et al.
8,711,552 B2 * 4/2014  Medica et al. ........... 361/679.02
2004/0196809 A1 * 10/2004 Dillinger ............... H04W 36/02
                                                              370/331
2011/0145445 A1 * 6/2011  Malamant et al. ............. 710/16

(Continued)

FOREIGN PATENT DOCUMENTS

CN   200810034491   3/2008
CN   201020628116   11/2010

(Continued)

OTHER PUBLICATIONS

Huang, Junwei et al. Dual-CPU Communication Design Program Based on 3G Smart Phone. Video Engineering, 2012, vol. 36, No. 8, pp. 47-49, 78.

(Continued)

Primary Examiner — Farley Abad
Assistant Examiner — Getente A Yimer

(57) ABSTRACT

A smart device with no AP includes: a central processing module for running an operation system and applications; a peripheral control module for connecting peripherals; and a message mechanism connected with the central processing module and the peripheral control module for transmitting messages therebetween. According to a preferred embodiment of the present invention, data transfer is provided by a shared memory of the two modules, and the messages simulate data exchanges in a USB transfer layer for connecting the peripherals to the central processing module as a USB compound device. The present invention disperses complexity of hardware and software of the smart device to the two modules for being provided easily. General CPU manufacturers and mobile phone chip manufacturers can avoid the complexity of AP with the present invention for easily joining a competition of the smart device such as a smart phone.

20 Claims, 4 Drawing Sheets

(56) References Cited

U.S. PATENT DOCUMENTS

| | | | |
|---|---|---|---|
| 2011/0153885 A1* | 6/2011 | Mak et al. | 710/106 |
| 2012/0042102 A1* | 2/2012 | Chung et al. | 710/33 |
| 2012/0044913 A1* | 2/2012 | Smadi | H04W 28/26 |
| | | | 370/336 |
| 2012/0087078 A1* | 4/2012 | Medica | G06F 1/1632 |
| | | | 361/679.31 |
| 2012/0246359 A1 | 9/2012 | Scragg, Jr. et al. | |
| 2012/0265913 A1* | 10/2012 | Suumaki; Jan | H04W 4/08 |
| | | | 710/303 |
| 2013/0080665 A1 | 3/2013 | Park et al. | |
| 2013/0080670 A1* | 3/2013 | Medica et al. | 710/110 |
| 2014/0181355 A1* | 6/2014 | Barbiero | G06F 13/4022 |
| | | | 710/316 |

FOREIGN PATENT DOCUMENTS

| | | |
|---|---|---|
| CN | 201210214408 | 1/2014 |
| CN | 201210214892 | 1/2014 |

OTHER PUBLICATIONS

Felix Xiaozhu Lin et al. Reflex: Using Low-Power Processors in Smartphones without Knowing Them. ACM SIGARCH Computer Architecture News, 2012, vol. 40, Issue 1, pp. 13-24.

* cited by examiner

SMART DEVICE WITH NO AP

BACKGROUND OF THE PRESENT INVENTION

Field of Invention

The present invention relates to a smart device, and more particularly to a smart device with no AP (application processor).

Description of Related Arts

Smart devices (such as smart phones) tend to use operating systems such as Windows and Linux because the functions are getting more complex and open; therefore, the smart devices tend to use APs (Application Processor) with strong functions. An AP is almost an independent computer, and almost all the peripherals can be connected on it. An AP comprises a strong central processing unit (CPU) for running a general operating system such as Windows and Linux, a strong bus and peripheral adapters connected on the bus. In one hand, the foregoing structure is complex in hardware because all the peripherals are loaded on one bus, in the other hand, the foregoing structure is complex in software because all the drivers of the peripherals are developed and run with the operating system. The operating system handles not only applications but also hardware events. A strong software development ability as well as a strong hardware development ability is needed for developing an AP, and that's why the core unit of a smart device, the AP, is controlled by few companies. When it comes to utilization, any change of the peripheral can lead to a change of the driver and further lead to a change of the operating system; therefore, it is difficult to change the configuration of the peripheral when the AP is utilized. When the industrial structure is involved, the utilization of AP has a great impact on mobile phone chip industry. Mobile phone chip is the most important part and the most valuable part of a feature phone; like an AP, the mobile phone chip comprises a CPU and various peripheral adapters for connecting various peripherals. But in a smart phone, the mobile phone chip is just utilized as a modem because of the utilization of the AP, and is connected with the AP as a peripheral which makes its ability of managing peripheral useless and decreases the value of the mobile phone chip. Therefore, the architecture of the smart phone with AP is a threat to mobile phone chip manufacturers. Furthermore, general CPU manufacturers cannot get involved in the production chain of smart devices because of having no AP development ability.

Therefore, the main objective of the present invention is to find a novel architecture for smart devices to disperse the difficulties and to decrease the amount of the software development workload as well as involving the general CPU manufacturers and the mobile phone chip manufacturers into the competition of smart phone.

Before the appearance of micro processor and PC, the computer systems comprised a pure CPU module for running operating system and applications. Peripherals are managed in relatively independent modules. Peripheral modules are connected to the CPU module by so call "I/O channel". This architecture worked quite efficiently. Now, USB (Universal Serial Bus) becomes so popular that almost all peripherals can be connected to a computer via USB. A computer needs to support only few peripherals. Other peripherals could be connected via USB. The PCI (Peripheral Component Interconnect) bus connectors in our PC becoming obsolete demonstrate well this fact.

USB is designed for connecting a peripheral to a host; the USB has been so successful since developed that almost all devices have drivers based on USB which means the device can be connected with a host by USB. Therefore, USB is a connecting method with great advantage, and driver developments on the main operating system for peripherals are saved with USB. However, the conventional USB is hard to be utilized as a built-in system bus; a main reason is that the USB is not flexible when connecting multi-function devices. A multi-function device is connected with a host by a conventional USB peripheral handler in a USB composite device. That means that the functional devices are arranged in one USB device, and a composite device driver must be provided in the host for separating the functions out before utilizing them. Additionally, the functional devices in a composite device cannot be increased or decreased independently, and the configuration of the functional devices must be determined before the functional devices are connected with the host. The configuration of the functional devices can only be changed by being disconnected and reconnected with the host, and it is impossible to change the configuration of other functional modules while keeping the connection of a certain functional module.

The USB standard defines another structure for connecting multi-function devices to a host: compound device. The compound device is a plurality of USB devices connected by a hub (which is like a USB subtree). Each function is connected on the host in an independent USB device (also called functional device). Because each function of the compound device is an independent USB device, the functional device drivers in the host can be utilized directly; therefore, the compound device has no driver problems as the composite device and is plug-and-play; at the meantime, it is flexible to control the functional devices and a plurality of peripherals can be integrated and connected with the operating system. Therefore, connecting the multi-function device to the host in a USB compound device form is an important step for utilizing the USB as a built-in system bus.

The FIG. 1 is a block diagram of a conventional USB host sub-system; the sub-system is provided in the host running in the operating system. The USB host sub-system comprises a USB functional device driver 101, a USB host module 102 and a USB host handler (including the root hub) 103. The host handler 103 is the hardware part of the sub-system (USB transceiver can be ignored in this discussion). The host module 102 is the software part that comprises a host control logic 104 and a host handler driver 105. The host handler driver 105 controls the host handler 103 and provides a USB transfer interface defined by the USB specification. The host control logic 104 realizes host functions defined by the USB specification with the transfer interface provided by the host handler driver 105. The functional device driver 101 realizes various classes of functional devices defined by the USB specification with the transfer interface provided by the host module 102 and loads the functional devices into an operating system by connecting to the operating system. Each kind of the functional devices such as mass storage (USB disk) and keyboard has its functional device driver; and USB hub is a special kind of functional devices, the USB hub serves only the host module and doesn't serve any other part of the operating system; the USB hub helps the host module to define a topological structure of the USB devices tree in such a manner to define acceptable signal latency for each device.

USB specification defines four kinds of transfer: control transfer, interrupt transfer, isochronous transfer and bulk transfer. The control transfer is only utilized by the host control logic and only exchanges date with the endpoint number 0 of a device, however, functional device drivers can utilize control transfer via the host control logic. Interrupt transfer ensures that the data can be received within predetermined latency. The isochronous transfer ensures that the data are sent with a predetermined bandwidth in each predetermined period for ensuring that the data are isochronously transferred. The bulk transfer has no guarantee of data transmission latency and isochronous transfer, but the USB will utilize all the available bandwidth for transferring the data as soon as possible. A USB system defines the data exchanges between the functional device drivers or the host control logic and the USB devices over USB transfer except for the device connecting directly to the downward port of a root hub and the events such as connection/disconnection detection, device speed detection and device reset, these events and actions are not in form of USB transfer. They should be treated by the root hub driver. So, to introduce a new USB subsystem to operating system like Windows, it's sufficient to provide a new USB host handler driver and a root hub driver. All what is based on USB transfer is already treated by operating system.

SUMMARY OF THE PRESENT INVENTION

An objective of the present invention is to provide a smart device with no AP and to reduce the work load of software developments on an operating system.

Accordingly, in order to accomplish the above objective, the present invention provides an architecture of a smart device, wherein the smart device is divided into a central processing module and a peripheral control module, the central processing module is like a general purpose CPU for running a main operating system and applications; the peripheral control module is like a conventional mobile phone chip of a feature phone for connecting and managing peripherals; the central processing module is connected with the peripheral control module by a message mechanism, and in the preferred embodiment, messages are utilized for simulating data exchanges in the USB transfer layer; and the peripheral control module is treated as a multi-function device and connected with the central processing module in form of a USB compound device for taking full advantages of USB peripheral drivers already existing in conventional general operating systems such as Windows or Linux in such a manner that the general operating systems can be run in the central processing module without treating hardware events of peripherals and without a lot of software developments.

When compared to conventional technologies, the present invention has advantages as follows:

(1) From point of view of software developments, the architecture of the smart device according to the present invention can reduce the work load of the software developments on the operating system;

(2) From point of view of hardware technologies, when compared to an AP, the architecture of the smart device according to the present invention is easier to be applied because the structure of the smart device is more like conventional technologies which are widely used.

(3) From point of view of impacts on a production chain of the smart devices, the architecture of the smart device according to the present invention avoids complexity of the AP in such a manner that general CPU technologies and mobile phone chip technologies can be easily applied on the smart devices such as smart phones and tablet for taking full advantages of general CPU manufacturers and mobile phone chip manufacturers in a smart device field.

These and other objectives, features, and advantages of the present invention will become apparent from the following detailed description, the accompanying drawings, and the appended claims.

DETAILED DESCRIPTION OF THE PREFERRED EMBODIMENT

Figure 1:
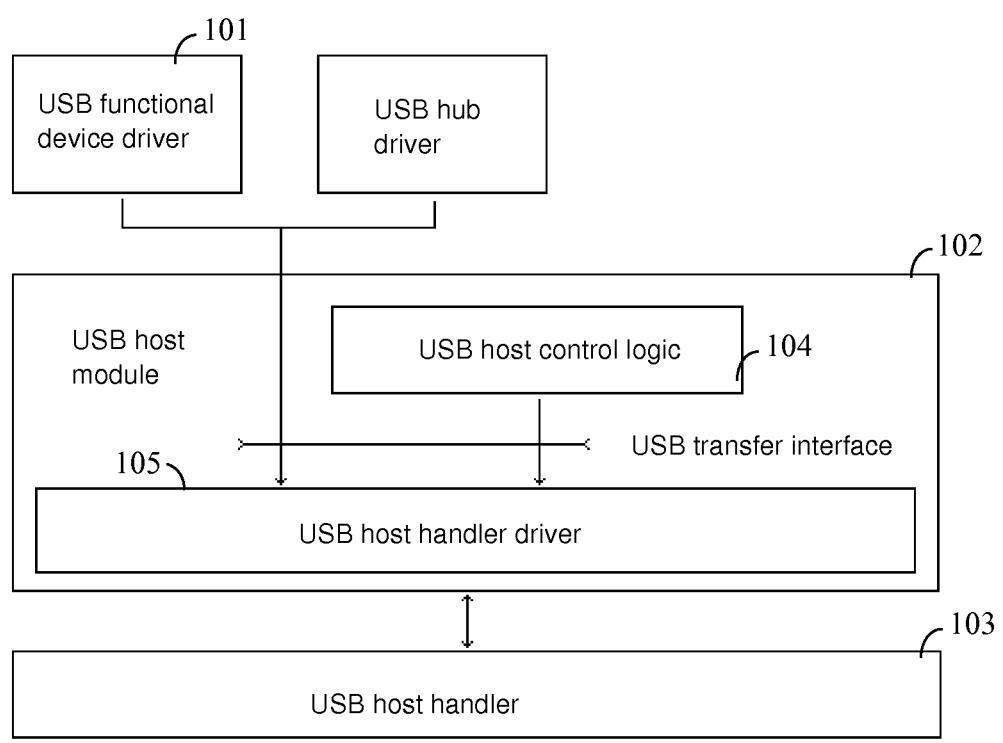
FIG. 1 is a structural block diagram of a USB host in conventional technologies.

Referring to the drawings, the present invention according to preferred embodiments is further illustrated, and is not intended to be limited.

As described in the background, USB functional device drivers and a host control logic are based on a USB transfer interface. USB transfer receives data from a device (also called input transfer) according to user requirements, or sends data to a device (also called output transfer) according to user requirements. All data exchanges between a USB host and a device can be represented as USB transfer, except for the root hub activities which concern a piece of hardware at the host side and so need a root hub to interface the operating system. A USB host handler can be replaced by a message transceiver and a pseudo USB host handler driver together with a pseudo root hub driver by packaging information of USB transfer as messages, and by defining some messages for simulating events and operations of the USB root hub activities If the USB host is close to the device, for example, the USB host and the device are provided on a same silicon die; or on different silicon dies in a same chip; or in different chips on a same PCB; or just in a same device, the data exchanges can be provided by the message mechanism such as a dual accessible memory or a shared memory between the modules which is simpler and quicker than a USB hardware system.

The method for simulating the USB transfer by the message mechanism can be further extended as: firstly, the messages transmitted by the message mechanism not necessarily simulate the data exchanges in the USB transfer layer. The messages can simulate the data exchanges at any layer such as the data exchanges between a functional device driver and an operating system; furthermore, the messages transmitted by the message mechanism not necessarily simulate the data exchanges between a device and an operating system in USB protocol. Any device interface with an operating system such as ATA, SATA or SCSI can be represented by their device driver interface with the operating system, that is, by data exchange via function call and event treatment. The data exchanges between any device driver and the operating system (wherein a function call is simulated as a data exchanges), or the data exchanges between any device and the operating system, or the data exchanges formed by encoding orders from the operating system to the device and events which should be reported to the operating system, or the data exchanges and an instruction set formed by modeling functions of the device can be simulated by the message mechanism in such a manner that a remote device is controlled by data communication for obtaining support. With the foregoing structure, the devices without USB support can be connected to the remote operating system by the message mechanism; secondly, the message mechanism can be based on any data communication method with sufficient speed. In a word, the operating system can control and utilize a peripheral by the message mechanism, the peripheral can be place where is away from the operating system.

In the USB hardware system, the host continuously sends polling to the endpoints of a device. A frame structure is established for realizing isochronous transfer and time limited transfer. All these are transparent in the USB transfer layer. The frame structure is provided for solving a special problem of physical layer that the devices share a same data transmission line. The same objective can be achieved by an easier method in a one to one message mechanism especially, when the message mechanism is provided with dual accessible memory or with shared memory. Firstly, the host doesn't need to poll endpoints. After sending a reading or writing requirement, the host could just wait for a report when the operation is finished. Secondly, the frame structure for realizing the isochronous transfer and the time limited transfer in the USB hardware system is no necessary. The time limited transfer of the data can be realized by adjusting priorities of the devices in the system. The isochronous transfer of data can be realized by data generating rate of data source, and data consuming rate of data receiver, adjustment of the priorities for the devices in the system and simulating a large USB transfer by a plurality of the messages for limiting a max length of the messages. Therefore, the four kinds of transfer defined by the USB specification can be considered as one kind if the transfer is simulated by the messages.

A structure similar to the structure of the host exists in a USB device. Drivers related to the USB in a device are called USB stacks. The USB device can also replace the USB hardware by a message mechanism with a partial change in the USB stack which means replacing layers under the USB transfer layer by the message transceiver of the message mechanism.

USB2 and USB3 are the same in the transfer layer. Replacing the USB hardware by the message mechanism adapts to the USB2 as well as the USB3.

Once the hardware limit is removed due to the replacement of USB hardware by the message mechanism, a multi-function device can be presented to the host in a USB compound device.

Figure 2:
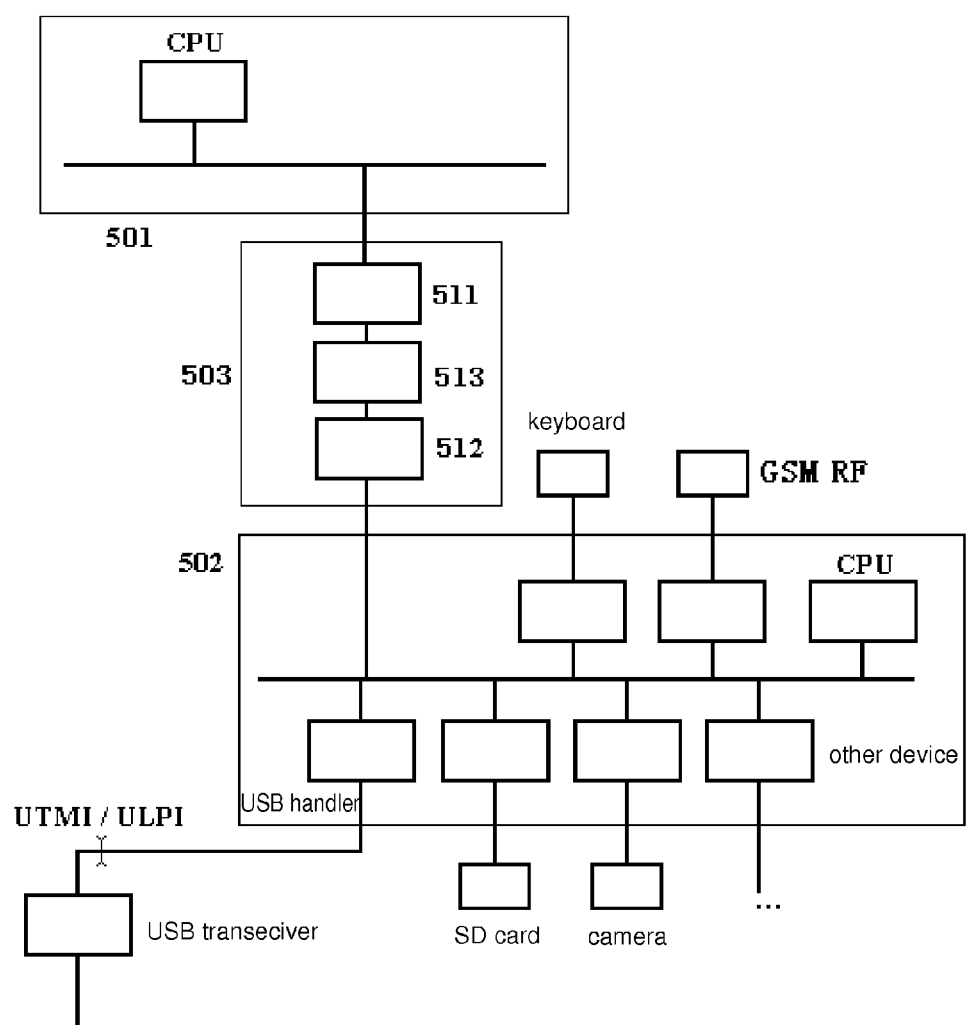
FIG. 2 is a structural sketch view of a smart device system according to an embodiment of the present invention.

Referring to the FIG. 2, a basic embodiment of the smart device architecture according to the present invention is provided. The structure comprises two modules: a central processing module 501 and a peripheral control module 502; the two modules are connected by a message mechanism 503 for transmitting messages between the central processing module 501 and the peripheral control module 502.

Preferably, the message mechanism 503 comprises a first message transceiver 511, a second message transceiver 512 and a data and signal transmitter 513. The first message transceiver 511 is usually provided in the central processing module 501; the second message transceiver 512 is usually provided in the peripheral control module 502; the data and signal transmitter 513 comprises a memory accessible by both the first message transceiver 511 and the second message transceiver 512 for transmitting the data and a plurality of signal wires for providing notification and handshake of the data transmission; the data and signal transmitter 513 could be provided in the central processing module 501, in the peripheral control module 502, or in a independent unit.

Preferably, the central processing module comprises: a first CPU, wherein the first CPU drives a bus that connects with the first message transceiver 511 of the message mechanism and with a plurality of auxiliary circuits such as memory, a clock and timing circuit, a DMA (Direct Memory Access) control circuit, an interrupt control circuit and a plurality of general purpose inputs/outputs (GPIO) (which are not shown in the drawings).

Preferably, the central processing module 501 is utilized for running general operation systems (such as Windows, Linux and Android). The peripherals managed by the peripheral control module 502 are connected with the central processing module 501 by the message mechanism in the USB compound device form defined by a USB specification. Because Windows and Linux supports already almost all the drivers for the devices based on the USB, it is convenient to running the devices based on the USB in the central processing module 501 as shown in the FIG. 2.

Preferably, peripheral control module 502 comprises: a second CPU, wherein the second CPU drives a bus that is connected to the second message transceiver 512 of the message mechanism and a plurality of peripheral adapters. The peripheral control module 502 exchanges messages with the central processing module 501 by the message mechanism 503, and the messages simulate the data exchanges between a host and a device in the transfer layer defined by the USB specification. Messages are defined for simulating orders which are not transferred by the USB transfer layer in such a manner that the peripheral control module 502 presents the peripherals to the central processing module 501 in the USB compound device form, and the peripherals connected with the peripheral control module are connect to or disconnect from the USB host independently as an independent device.

Preferably, the USB handler in the peripheral control module 502 can be used to connect the peripherals in the peripheral control module 502 with external USB host as a USB device by a USB cable after being connected with the USB transceiver through a UTMI/ULPI (USB2.0 Transceiver Macrocell Interface/UTMI+Low Pin Interface) (or other private interfaces).

The smart device as described in FIG. 2 can provide USB OTG (On The Go) to an external equipment. The USB handler in the peripheral control module can be a USB OTG handler. When the smart device should play the role of a USB device in a connection, the CPU in the peripheral control module will expose the requested device to the external equipment via the USB device handler of the OTG handler. When the smart device should play the role of a host in a connection, the message mechanism will play the role of a relay at USB transfer layer between the USB host handler driver, which is provided in the peripheral control module, and the USB host control logic and functional device driver which are provided in the central processing module.

The peripheral control module 502 is similar to a mobile phone chip of a conventional feature phone, and can manage the peripherals such as mass storage (such as a SD (secure digital) memory card), cameras, keyboards and wireless communication devices (such as GSM (Global System For Mobile Communication) and RF (Radio Frequency) devices); other devices in the drawings represents devices such as Wi-Fi (Wireless Fidelity), display, Bluetooth and NFC (Near Field Communication) devices.

Although no display card is provided to the system by a USB interface, it is not difficult to display with the USB. The Windows has a remote login functionality which permits a PC (personal computer) to login in a Windows in another PC and utilize the remote Windows like the local Windows. That shows that Windows can transfer display to a remote display device via network, while network via USB exists, therefore, it's possible to make Windows running on central processing module 501 to display on peripheral control module 502 by network card via USB. Linux can transfer its display to an X terminal via network. Therefore, it's possible to make Linux running on central processing module 501 to display on peripheral control module 502 by providing an X server in the peripheral control module.

The basic idea of the architecture of smart device according to the present invention is taking full advantages of the existing technologies for forming a central processing module and a peripheral control module and then connecting the two modules with a convenient method in such a manner the complexity of the AP is avoided. Some existing CPUs have already integrated a display card and a graphic accelerator, therefore, the central processing module 501 should not be limited to just comprise the first CPU and the first message transceiver. The central processing module 501 can also comprise a display card and a graphic accelerator. More generally, the system should not be limited to have just one peripheral control module 502, it could have a plurality of the peripheral control modules and could configure the embodiment according to the detailed requirements and possibility of the available technologies for connecting the peripheral control modules to the central processing module; furthermore, the peripheral control modules can have different structures.

Figure 3:
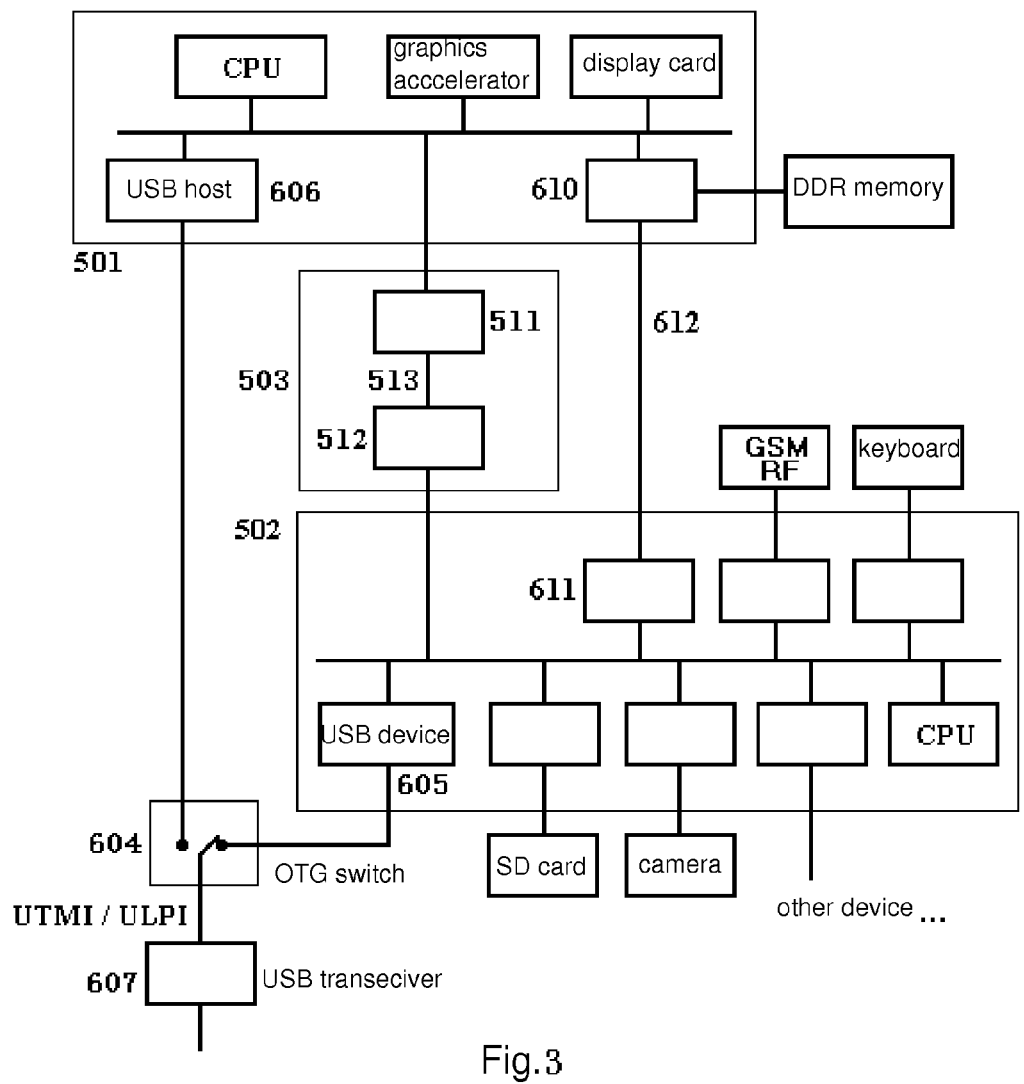
FIG. 3 is a structural sketch view of a smart device with OTG (On-The-Go) and a shared memory according to a preferred embodiment of the present invention.

Referring to the FIG. 3, a more practical preferred embodiment of the present invention is provided, comprising: a USB OTG solution, a message mechanism, a shared memory for a central processing module 501 and a peripheral control module 502, a display card and a graphics accelerator provided in the central processing module 501. Unlike conventional OTG, the host handler of the USB OTG and the device handler are not provided together and are respectively provided in the central processing module 501 and the peripheral control module 502. A USB host handler 606 is provided in the central processing module 501 for providing a host functionality of the OTG.

The USB host handler 606 in the central processing module 501 and the USB device handler 605 in the peripheral control module 502 are connected, by a two-way switch 604, to the USB transceiver 607 via the UTMI/ULPI interface (or other interfaces). The USB transceiver is then connected to the external interface. The central processing module 501 plays a role as the host with the host handler 606, and the peripheral control module 502 plays a role as the USB device with the device handler 605.

When the smart device is connected with an external equipment via the external interface, the two-way switch 604 connects the transceiver to the peripheral control module or to the central processing module after having determined the role of the smart device in the connection according to USB OTG specification. If the role to play is host, the transceiver is connected with the host handler 606 in the central processing module 501; if the role to play is device, the transceiver is connected with the device handler 605 in the peripheral control module 502.

Referring to the FIG. 3, the preferred embodiment further comprises a shared memory for the central processing module 501 and the peripheral control module 502. A memory manager 610 in the central processing module 501 is connected with an external DDR (Double Data Rate) memory and provides in one hand the memory access channels to the CPU and other components in the central processing module 501. The memory manager 610, in the other hand, provides the memory access channels to peripheral control module. A corresponding memory adapter 611 provided in the peripheral control module 502 and connected with the memory manager 610 through a memory connecting circuit 612 that permits the CPU and other component in the peripheral control module to share the DDR memory. A lot of existing interfaces such as chip to chip (C2C) interface and low latency interface (LLI) provide memory connecting functionality. The memory manager 610, the memory adapter 611 and the memory connecting circuit 612 in the FIG. 3 can also be provided by other solution for sharing memory between chips. Sharing memory between the central processing module 501 and the peripheral control module 502 is a mature technology because the memory access speed is high enough, cache technology is utilized in the CPU for decreasing the requirement for the bandwidth of the memory, and the DDR memory can be accessed by more than four channels. With the shared memory, the CPU in the peripheral control module 502 and other components can share the RAM (Random Access Memory) provided in the central processing 501 by the memory adapter 611, as if the RAM were connected with the peripheral control module 502.

With the shared memory, the message mechanism 503 can be simplified. The overall performance of the system can also be improved to a similar level of a single-module structure. The message mechanism 503 can transfer the data part of messages through the shared memory. Therefore, only a few signal wires in the signal transmitter 513 are needed for sending signals and handshakes.

By transmitting the data part of message by shared memory, the times of data copy are decreased in such a manner that the performance could be greatly improved. For example, in a read operation of a mass storage, the operation of reading a sector comprises the steps of: 1. Application requires a data reading, 2. The host allocates memory in a memory area reserved for the message mechanism and then sends the read command together with the address of the allocated memory to the peripheral control module in form of message, 3. Peripheral control module reads the data from the flash memory and writing the data directly to the memory address provided by the message, 4. Peripheral control module reports to the host by a message for notifying that the command has been executed, 5. The host copies the read data from the allocated memory to the memory provided by the application. It can be seen that the steps are almost the same as that when the flash memory and the application are in a same module.

Because the main function of a display card is to scan the displaying images in memory and transform the displaying images into displaying signals, the display card usually requires a constant memory bandwidth. In the shared memory solution as shown in the FIG. 4 with the multi-channel memory access, the displaying card can be provided in the central processing module as well as in the peripheral control module.

Having separated USB host handler and device handler, the smart device as shown in the FIG. 3 has another advantage that the central processing module 501 and the peripheral control module 502 can be developed and tested separately. The central processing module 501 can be tested by the conventional USB devices with a general USB device. The peripheral control module 502 can be tested by being connected with a PC.

The central processing module 501 and the peripheral control module 502 according to the present invention can be provided on the same silicon die; or on different silicon dies in the same chip; or in different chips on the same PCB; or on different PCB with a fixed connection in the same device.

A basic feature of the architecture of the smart device according to the present invention is splitting the management of the peripherals out of the running environment of the operation system. The environment for managing the peripherals are provided by another module in such a manner that the main operating system treats less hardware events and focuses on the data treatment. Another benefit is that the main operating system is not affected by the change of the peripheral and is easier to maintain. Another basic feature of the architecture of the smart device according to the present invention is connecting the central processing module to the peripheral control module by a message mechanism. The message mechanism can be any type of data communication that permits the exchange of encoded message. The present invention enumerates only the message mechanism with memory because the message mechanism with memory is a preferred embodiment under common conditions. However, in practice, the message mechanism can also be established by a high speed communication method if the system comprises the high speed communication method.

Using messages to simulate the data exchange in the USB transfer layer should not be considered as a limit. The message can simulate the data exchange between the main operating system and any peripheral in any layer. The devices not supported by USB can be provided in the peripheral control module by simulating the data exchange between operating system and the device. For example, the display card in the peripheral control module can scanning the displaying image in a shared memory, and the commands to the display card can be transmitted by the message mechanism. And by simulating the devices having mature drivers, software resources thereof can be utilized. For example, by simulating the data exchanges between the host and the device defined by ATA (Advanced Technology Attachment), SATA (Serial ATA) or SCSI (Small Computer System Interface) specifications, a storage devices connected with the peripheral control module such as SD cards can presented to the operating system running in the central processing module as an ATA, a SATA or an SCSI disk. By mean, the problem that Windows cannot boot on a USB disk could be solved. However, an advantage of using USB disk is that the disk can be dynamically removed from the central processing module and then be connected with other USB host such as a PC. A lot of devices can be connected to operating system running in the central processing module from the peripheral control module by simulating the data exchange of SCSI specification with the message mechanism because a lot of devices can be connected with the operating system by SCSI.

Figure 4:
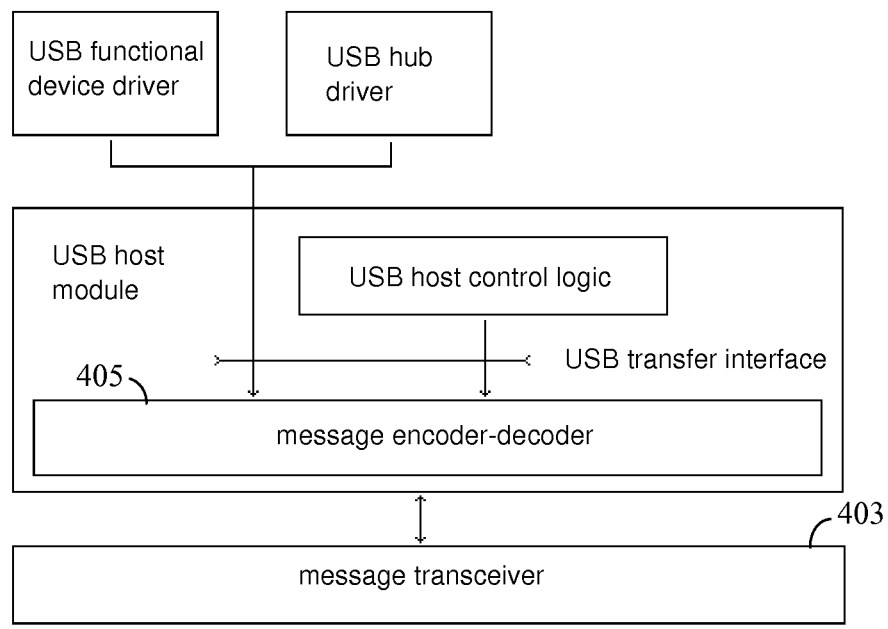
FIG. 4 is a structural block diagram of a USB host where a USB host handler is replaced by a message mechanism according to the preferred embodiment of the present invention.

Referring to the FIG. 4, the USB host sub-system (running in the central processing module) according to the present invention is provided. And a similar structure is correspondingly provided on a device side. Different from the structure in the FIG. 1, hardware in the lowest layer is replaced by the message transceiver 403, and the host handler driver is replaced by the message encoder-decoder 405 at the layer just above the lowest layer, wherein the message encoder-decoder 405 provides a similar USB transfer interface to the higher layers and plays the role of a driver for the transceiver 403 (including simulating a root USB hub driver). Other software components remain unchanged compare to FIG. 1. Similar changes should be provided to the device side (provided in the peripheral control module) because a similar structure exists therein.

When encoding a USB transfer in message, one USB transfer corresponds to two messages because the USB transfer is started by the host and the device needs time to execute the transfer, wherein the first message comprising all information about the transfer is sent to the device by the host, and the second message is sent to the host after the data transfer is accomplished by the device for reporting results (in case the transfer passes a command, the reported results of the transfer, for example, is the reception of the command and not the result of the command execution). The information involved in a transfer encoding comprises: USB address, endpoint number, endpoint data direction, data buffer address, data size, transfer type, transfer number, etc. If the message mechanism transfers other contents than USB transfer, message type should be added in the list of information to be encoded. Message number can be added in such a manner that flow control can be provided with the message number and the transfer number (large transfer, for example, is divided into several small message exchanges). USB transfer can be classified in input transfer and output transfer. The direction is always relative to the host. An input transfer inputs data from a device, and an output transfer outputs the data to a device. An input/output requirement of the application can be divided in a plurality of USB transfers by the USB functional device driver. For example, when an application requires reading a sector from an USB disk, the USB mass storage driver will send three or more USB transfer: 1. an output transfer for sending the reading command to the USB disk; 2. an input transfer for receiving the data read by the USB disk; 3. an input transfer for receiving the execution report from the device, and the mass storage driver decides whether to continue for further read data and read result transfer or not. When the application requires writing data into a sector of an USB disk, the mass storage driver will also send three USB transfer: 1. an output transfer for sending the writing command to the USB disk; 2. an output transfer for sending data for writing; 3. an input transfer for receiving the command execution report from the device.

For realizing the above preferred embodiments, efforts should be done on the software and especially on the USB stack of the peripheral control module. However, the changes are all partial changes. A method for connecting the peripherals managed by the peripheral control module to a central processing module (USB host) in form of a USB compound device comprises steps of:

1. Sending a message to central processing module (host) for simulating the event of a device connects to the root hub (or the hardware event can be generated automatically by the message transceiver in the host side when the system is starting);

2. Enumerating the device, wherein because the enumeration is based on USB transfer, realizing the enumeration by messages is a conventional technology; the peripheral control module reports that the connecting device is a USB hub in the enumeration, the peripheral control module simulates a hub;

3. Sending a message to the host for simulating the event that a device is connected to a downward port of the hub (by responding an input transfer of the hub driver);

4. Carrying out the enumerate process for the newly connected device until the host accepts the newly connected devices and distributes a USB addresses;

5. Repeating the step 3 and step 4 until that all the devices needed to be connected are connected.

One skilled in the art will understand that the embodiment of the present invention as shown in the drawings and described above is exemplary only and not intended to be limiting.

The term "smart device" should not be limited to smart phone or tablet. A computer like a PC or a server could be considered as a smart device also. The current invention could be applied to a general computer to improve its performance (by separating the operating system from the hardware event treatment for example).

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A smart device with no AP (Application Processor), comprising:

a central processing module for running an operation system and applications;

a peripheral control module for connecting peripherals; and a message mechanism for transmitting messages between said central processing module and said peripheral control module;

wherein said message mechanism comprises a first message transceiver and a second message transceiver respectively connected with said central processing module and said peripheral control module; and a circuit connected with said first message transceiver and said second message transceiver for transmitting signals or signal and data;

wherein said central processing module comprises:

a first CPU (Central Processing Unit), wherein said first CPU is connected with said first message transceiver for sending and receiving said messages, said first CPU is utilized for running said operation system and said applications, said operating system transforms data exchanges and control operations with said peripherals into said messages, then communicates with said peripheral control modules by said message mechanism in such a manner that data processing is handled by said operating system without treating hardware events of said peripherals;

wherein said peripheral control module comprises:

a second CPU; and a peripheral adapter, wherein said peripheral adapter is connected with said peripherals and introduces said peripherals into said peripheral control module, said second CPU is connected with said second message transceiver for sending and received said messages; a control program running on said second CPU transforms said messages received from said central processing module into said data exchanges and said control operations and applies on corresponding said peripherals, then said control program transforms results in a message form and then sends to said central processing module, said hardware events are treated by said control program and treating results are reported to said central processing module in form of said message.

2. The smart device, as recited in claim 1, wherein said messages transmitted by said message mechanism comprise messages that simulate data exchanges between a host and a device defined by a USB (Universal Serial Bus) specification, said peripheral control module presents said peripherals to said operating system running in said central processing module in form of a USB compound device, and said peripherals connected with said peripheral control module are connected to or disconnect from said operating system independently.

3. A smart device with no application process (AP), comprising:

a central processing module for running an operation system and applications;

a peripheral control module for connecting peripherals; and a message mechanism for transmitting messages between said central processing module and said peripheral control module;

wherein said message mechanism comprises a first message transceiver and a second message transceiver respectively connected with said central processing module and said peripheral control module; and a circuit connected with said first message transceiver and said second message transceiver for transmitting signals or signal and data;

wherein said central processing module comprises:

a first central processing unit (CPU), wherein said first CPU is connected with said first message transceiver for sending and receiving said messages, said first CPU is utilized for running said operation system and said applications, said operating system transforms data exchanges and control operations with said peripherals into said messages, then communicates with said peripheral control modules by said message mechanism in such a manner that data processing is handled by said operating system without treating hardware events of said peripherals;

wherein said peripheral control module comprises:

a second CPU; and a peripheral adapter, wherein said peripheral adapter is connected with said peripherals and introduces said peripherals into said peripheral control module, said second CPU is connected with said second message transceiver for sending and receiving said messages; a control program running on said second CPU transforms said messages received from said central processing module into said data exchanges and said control operations and applies on corresponding said peripherals, then said control program transforms results in a message form and then sends to said central processing module, said hardware events are treated by said control program and treating results are reported to said central processing module in form of said message;

wherein said messages transmitted by said message mechanism comprise messages that simulate data exchanges between a host and a device defined by a universal serial bus (USB) specification, said peripheral control module presents said peripherals to said operating system running in said central processing module in form of a USB compound device, and said peripherals connected with said peripheral control module are connect to or disconnect from said operating system independently;

wherein said messages simulating data exchanges between USB host and device simulate data exchange at a USB transfer layer as defined by said USB specification.

4. The smart device, as recited in claim 1, wherein said messages transmitted by said message mechanism comprise messages that simulate data exchanges between a host and a device defined by an ATA (Advanced Technology Attachment) or a SATA (Serial ATA) specification, said peripheral control module presents storage device connected with said peripheral control module to said operating system running in said central processing module as an ATA or a SATA device.

5. The smart device, as recited in claim 1, wherein said messages transmitted by said message mechanism comprise messages that simulate data exchanges between a host and a device defined by an SCSI (Small Computer System Interface) specification, said peripheral control module presents device connected with said peripheral control module to said operating system running in said central processing module as an SCSI device.

6. The smart device, as recited in claim 1, wherein said message mechanism comprises a memory accessible by said central processing module and said peripheral control module, the data part of said messages transmitted by said message mechanism is transmitted by said memory.

7. The smart device, as recited in claim 1, wherein said central processing module and said peripheral control module use a shared memory, said data part of said messages transmitted by said message mechanism is transmitted by said shared memory.

8. The smart device, as recited in claim 1, wherein said central processing module further comprises a graphics accelerator, or comprises a graphics accelerator and a display module.

9. The smart device, as recited in claim 1, further comprises a USB OTG (USB On The Go) structure;
wherein the USB host handler of said USB OTG structure is provided in said central processing module;
wherein the USB device handler of said USB OTG structure is provided in said peripheral control module;
wherein said USB host handler and said USB device handler of said USB OTG structure are connected with a USB transceiver, which is connected with external USB interfaces, by a two-way switch; when said smart device is connected with an external equipment by said USB interface, said external equipment is connected with said USB host handler for that said smart device plays a role of a USB host or with said USB device handler for that said smart device plays a role of a USB device by said two-way switch after having determined the role of said smart device in said connection.

10. The smart device, as recited in claim 1, wherein said central processing module and said peripheral control module are provided on a same silicon die; or on different silicon dies in a same chip; or in different chips on a same PCB (Printed Circuit Board); or on different PCBs with a fixed connection in a same device.

11. The smart device, as recited in claim 3, wherein said messages transmitted by said message mechanism comprise messages that simulate data exchanges between a host and a device defined by said ATA or SATA specification, said peripheral control module presents a storage device connected with said peripheral control module to said operating system running in said central processing module as an ATA or a SATA device.

12. The smart device, as recited in claim 3, wherein said messages transmitted by said message mechanism comprise messages that simulate data exchanges between a host and a device defined by an SCSI specification, said peripheral control module presents a device connected with said peripheral control module to said operating system running in said central processing module in an SCSI device.

13. The smart device, as recited in claim 12, wherein said central processing module and said peripheral control module use a shared memory, said data part of said messages transmitted by said message mechanism is transmitted by said shared memory.

14. The smart device, as recited in claim 13, wherein said central processing module further comprises a graphics accelerator, or comprises a graphics accelerator and a display module.

15. The smart device, as recited in claim 14, further comprises a USB OTG structure;
wherein the USB host handler of said USB OTG structure is provided in said central processing module;
wherein the USB device handler of said USB OTG structure is provided in said peripheral control module;
wherein said USB host handler and said USB device handler of said USB OTG structure are connected with a USB transceiver, which is connected with said external USB interfaces, by a two-way switch;
when said smart device is connected with an external equipment by said USB interface, said external equipment is connected with said USB host handler for that said smart device plays said role of a USB host or with said USB device handler for that said smart device plays said role of a USB device by said two-way switch after having determined the role of said smart device in said connection.

16. The smart device, as recited in claim 15, wherein said central processing module and said peripheral control module are provided on a same silicon die; or
on different silicon dies in a same chip; or in different chips on a same PCB; or
on different PCBs with a fixed connection in a same device.

17. The smart device, as recited in claim 12, wherein said message mechanism comprises a memory accessible by said central processing module and said peripheral control module, the data part of said messages transmitted by said message mechanism is transmitted by said memory.

18. The smart device, as recited in claim 12, wherein said central processing module further comprises a graphics accelerator, or comprises a graphics accelerator and a display module.

19. The smart device, as recited in claim 12, further comprises a USB OTG structure;
wherein the USB host handler of said USB OTG structure is provided in said central processing module;
wherein the USB device handler of said USB OTG structure is provided in said peripheral control module;
wherein said USB host handler and said USB device handler of said USB OTG structure are connected with a USB transceiver, which is connected with external USB interfaces, by a two-way switch;
when said smart device is connected with an external equipment by said USB interface, said external equipment is connected with said USB host handler for that said smart device plays a role of a USB host or with said USB device handler for that said smart device plays a role of a USB device by said two-way switch after having determined the role of said smart device in said connection.

20. The smart device, as recited in claim 12, wherein said central processing module and said peripheral control module are provided on a same silicon die; or on different silicon dies in a same chip; or in different chips on a same PCB; or on different PCBs with a fixed connection in a same device.

* * * * *